United States Patent
Parker, IV

[11] Patent Number: 5,701,846
[45] Date of Patent: Dec. 30, 1997

[54] KNIT CELLULAR CATTLE MATTRESS FABRIC

[75] Inventor: Norman Marion Parker, IV, LaGrange, Ga.

[73] Assignee: Milliken Research Corporation, Spartanburg, S.C.

[21] Appl. No.: 742,608

[22] Filed: Oct. 28, 1996

[51] Int. Cl.$^6$ .................................................. A01K 1/015
[52] U.S. Cl. ........................... 119/526; 119/28.5; 5/710; 5/420
[58] Field of Search ........................ 119/526, 28.5; 5/485, 482, 502, 426, 470, 709, 710, 420; 54/79.3

[56] References Cited

U.S. PATENT DOCUMENTS

| | | | |
|---|---|---|---|
| 2,081,334 | 5/1937 | Kickenbush | 119/28 |
| 2,620,493 | 12/1952 | Brelsford | 5/709 |
| 2,731,652 | 1/1956 | Bishop | 5/710 |
| 3,584,436 | 6/1971 | Gulyas | 54/79.3 |
| 4,136,412 | 1/1979 | Wilhelm | 5/710 X |
| 4,748,768 | 6/1988 | Jacobsen | 5/740 X |
| 4,835,800 | 6/1989 | Johnson | 5/420 |
| 5,002,014 | 3/1991 | Albin | 119/28.5 |
| 5,023,970 | 6/1991 | Tesch | 5/482 X |
| 5,226,384 | 7/1993 | Jordan | 119/28.5 |
| 5,303,435 | 4/1994 | Haar et al. | 5/420 X |
| 5,388,295 | 2/1995 | Sarkozi | 5/420 X |

FOREIGN PATENT DOCUMENTS

| | | | |
|---|---|---|---|
| WO86/00781 | 2/1986 | WIPO | A01K 1/00 |
| WO94/15452 | 7/1994 | WIPO | A01K 1/015 |

Primary Examiner—Gene Mancene
Assistant Examiner—Yvonne R. Abbott
Attorney, Agent, or Firm—Terry T. Moyer; Earle R. Marden

[57] ABSTRACT

A cattle mattress made from a double needle bar knit fabric in which the top and bottom layers tire joined at intervals across the fabric, forming tubes into which crumb rubber is inserted and which are closed off after insertion of the crumb rubber to make a self-contained structure for the comfort of animals.

8 Claims, 1 Drawing Sheet

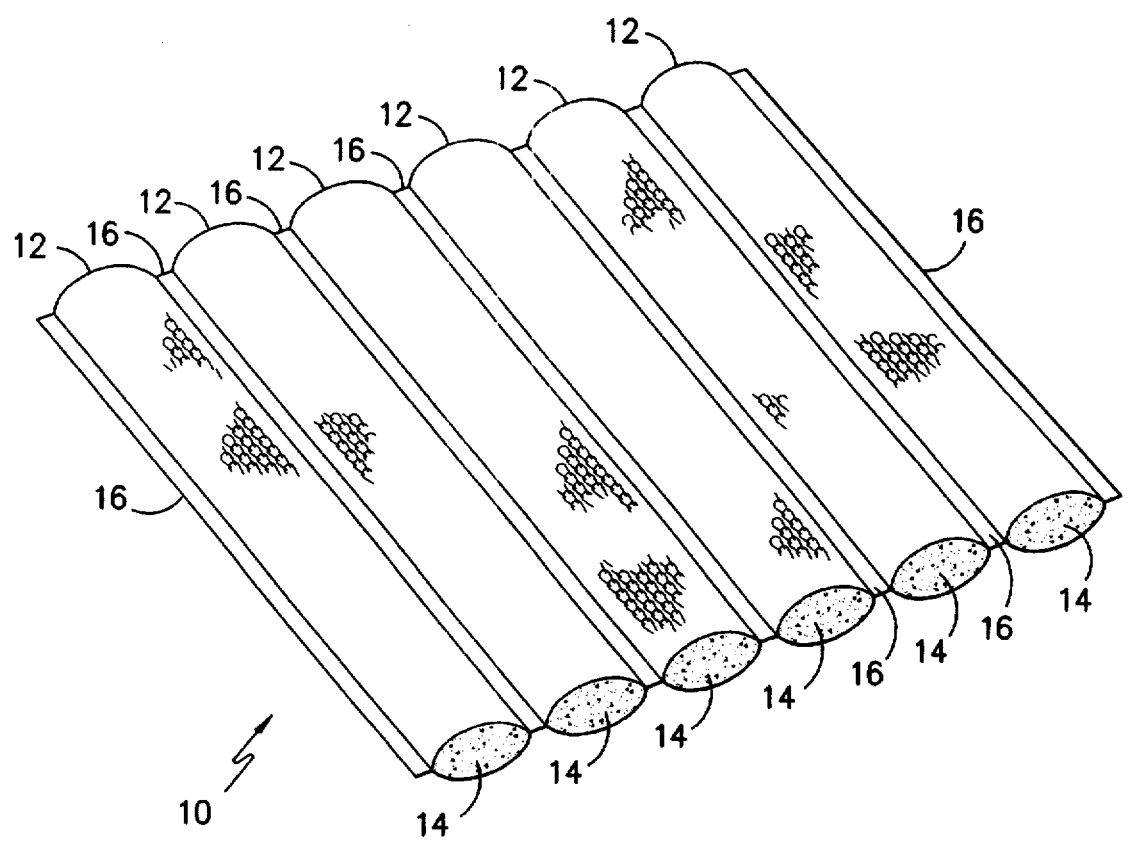

KNIT CELLULAR CATTLE MATTRESS FABRIC

This invention relates to an animal mattress which is particularly intended operatively to be disposed on a concrete or other hard floor within a barn or the like and on which, for example, cows may lie.

After feeding, cows traditionally lie down in the pasture while chewing the cud, and there has hitherto been the problem that during severe winter weather and other periods of inclement weather when the cows are kept in a barn or similar structure the cows are uncomfortable and are not contented when lying down on a concrete or similarly hard floor of the barn. Furthermore, cows nowadays are typically being kept permanently in a barn or similar structure irrespective of the weather conditions. With the view to alleviating this problem, various solutions have hitherto been proposed to render the feel of the concrete or similar hard floor of the barn more akin to that of the pasture. Thus, for example, it has previously been proposed to provide on the floor of the barn bedding materials such as straw, peanut hulls, saw dust, ground paper, sand or other items available on which the cow lies down. This arrangement has not been fully satisfactory because even when contained in a conventional bag, movement of the cow tends to push the bedding materials within the bag from under the cow. In an alternative proposed solution an unrestrained layer of shredded crumb rubber from used vehicle tires has been located on the floor in the stall of the barn with a blanket secured over this layer of crumb rubber and with the cow then lying on top of the blanket. While such a layer of comminuted rubber provides, from the standpoint of the cow, a degree of resiliency and feel which is very similar to that of the pasture, this alternative solution again suffers from the disadvantage that movement of the cow results in the comminuted rubber being displaced from under the cow so that the advantages of the cow lying on the layer of comminuted rubber are no longer achieved.

It is a primary object of the present invention to provide an animal mattress which is operatively disposed on the floor in the stall of a barn and which achieves the advantage of the above-mentioned alternative arrangement comprising a layer of comminuted rubber that the cow lying thereon has a level of comfort comparable to the provided by the pasture, while obviating or mitigating the above-described disadvantage of the previously proposed arrangements.

It is to be emphasized that an animal mattress according to the present invention is not restricted in use to cows lying thereon, and the mattress may be used for other cattle and horses to lie thereon. Furthermore, an animal mattress according to the present invention may also advantageously be used on the floor of, example, a hog breeding area.

In accordance with the present invention there is provided an animal mattress comprising a fabric enclosure having a plurality of separate compartments within the enclosure. Comminuted resiliently deformable material is disposed within each of the compartments.

In order that the invention may be more clearly understood and more readily carried into effect the same will now, by way of example, be more fully described with reference to the accompany drawing in which Figure One is an isometric view of an animal mattress according to a preferred embodiment of the invention.

Looking now to the drawing, the reference number 10 represents a cattle mattress comprised of a series of tubes 12 filled with crumb rubber 14 to provide comfort to the animal lying thereon. The mattress is a double needle bar warp knit fabric with tubes 12 being formed from independent top and bottom layers joined at intervals 16 across the width of the fabric. The ends of the tubes 12 are sealed in conventional manner by sewing or heat sealing.

As mentioned above, the basic fabric is a five bar Raschel double needle bar warp knit fabric of nylon, polyester or polypropylene multi-filament yarns in the denier range of 100–400 with 10–40 courses per inch and 10–30 wales per inch.

In the preferred form of the invention, the upper portion of the tubes 12 is knit on bars 1 and 2 with a stitch formation, respectively, of 45/22/10/22 and 01/11/10/00 of polyester yarn with the yarn on bar one being 150 denier and the yarn on bar 2 being 300 denier. The lower portion of the tube is knit on bars 5 and 6 with a stitch formation respectively of00/01/11/10 and of 22/45/22/10 using polyester yarn, respectively of 300 denier and 150 denier. The single ply area 16 of polyester yarn has a stitch formation of 01/10/10/01 knit on either bar 3 or 4 of 150 denier yarn. The basic fabric has 17 wales per inch and 30 courses per inch.

The fabric is shipped in its knit form to a customer where it will be cut to length and have one end of each tube closed by sewing, etc.. The crumb rubber will then be inserted into the tubes 12 at the other end and then this end will be closed to provide a self-contained animal mattress. The mattresses are placed in the stall area of the animal housing and then covered with a heavy textile cover.

It has been found that mattresses of this nature provide comfort which, in the case of cows, will result in an increase in milk production. Furthermore, the described mattress results in less waste handling time and aids in keeping animals cleaner and healthier.

Although we have described in detail the preferred embodiment of the invention, it is contemplated that changes may be made without departing from the scope or spirit of the invention and one desired to be limited only by scope of the claims.

We claim:

1. An animal mattress comprising a double needle bar warp knit fabric having tubes formed from independent top and bottom layers joined at intervals across the width of the fabric, soft shredded compound material in said formed tubes and means closing the ends of said tubes to prevent the escape of the shredded material.

2. The mattress of claim 1 whereas said shredded compound material is crumb rubber.

3. The mattress of claim 1 wherein said fabric is a five bar fabric.

4. The mattress of claim 3 wherein said knit fabric is substantially all polyester.

5. The mattress of claim 4 wherein said knit fabric has a stitch formation of45/22/10/22, 01/11/10/00, 01/10/10/01, 00/01/11/10, 22/45/22/10.

6. The method of making an animal mattress comprising the steps of: double needle bar warp knitting a fabric having independent top and bottom layers joined at intervals across the width, closing off one end of each tube, filling each tube with crumb rubber and closing off the other end of each tube to prevent the escape of crumb rubber from the tubes.

7. The method of claim 6 wherein the fabric is knit on five bars of a warp knitting machine.

8. The method of claim 7 wherein the fabric is knit with a stitch formation of 45/22/10/22, 01/11/10/00, 01/10/10/01, 00/01/11/10, 22/45/22/10.

* * * * *

UNITED STATES PATENT AND TRADEMARK OFFICE
CERTIFICATE OF CORRECTION

PATENT NO. : 5,701,846
DATED : December 30, 1997
INVENTOR(S) : Norman Marion Parker, IV It is certified that error appears in the above-indentified patent and that said Letters Patent is hereby corrected as shown below:

Abstract - delete the word "tire" addthe word "are".

Signed and Sealed this

Thirty-first Day of March, 1998

Attest:

BRUCE LEHMAN

Attesting Officer

Commissioner of Patents and Trademarks